(12) United States Patent
Torii

(10) Patent No.: US 7,746,493 B2
(45) Date of Patent: Jun. 29, 2010

(54) JOB MANAGEMENT APPARATUS AND METHOD OF RECOGNIZING JOB COMPLETION, AND CONTROL PROGRAM USED THEREWITH

(75) Inventor: Minoru Torii, Machida (JP)

(73) Assignee: Canon Kabushiki Kaisha, Tokyo (JP)

( * ) Notice: Subject to any disclaimer, the term of this patent is extended or adjusted under 35 U.S.C. 154(b) by 1502 days.

(21) Appl. No.: 11/039,983

(22) Filed: Jan. 21, 2005

(65) Prior Publication Data

US 2005/0162693 A1   Jul. 28, 2005

(30) Foreign Application Priority Data

Jan. 23, 2004   (JP)   .............................. 2004-015830

(51) Int. Cl.
  G06F 3/12     (2006.01)
  G06K 15/00    (2006.01)
(52) U.S. Cl. ..................................... 358/1.15; 358/1.16
(58) Field of Classification Search .................. 358/1.1, 358/1.8, 1.9, 1.13, 1.14, 1.15, 400, 474, 1.16; 709/202; 707/204

See application file for complete search history.

(56) References Cited

U.S. PATENT DOCUMENTS

| 7,148,985 B2 * | 12/2006 | Christodoulou et al. ..... 358/1.15 |
| 7,170,622 B2 * | 1/2007 | Nobuhara et al. .......... 358/1.15 |
| 7,386,586 B1 * | 6/2008 | Headley et al. ............. 709/202 |
| 2005/0038836 A1 * | 2/2005 | Wang .......................... 707/204 |

FOREIGN PATENT DOCUMENTS

JP    2000-330739 A    11/2000

* cited by examiner

Primary Examiner—Gabriel I Garcia
(74) Attorney, Agent, or Firm—Canon USA Inc IP Div

(57) ABSTRACT

A method for managing a job sent from an information processing apparatus to a network device to process the job. The method includes managing job information representing status of the job processing which changes in a time series manner, deleting the job information after lapse of a predetermined time after completing the job processing by the network device, acquiring the managed job information, recognizing whether or not the job information has already been deleted, and recognizing that the job processing is completed responsive to one of recognizing that the job information has already been deleted and acquiring the job information that the job processing is completed.

7 Claims, 9 Drawing Sheets

JOB MANAGEMENT APPARATUS AND METHOD OF RECOGNIZING JOB COMPLETION, AND CONTROL PROGRAM USED THEREWITH

BACKGROUND OF THE INVENTION

1. Field of the Invention

The present invention relates to a job management apparatus and method for managing a job which is processed in a peripheral apparatus, and to a control program used therewith.

2. Description of the Related Art

In general, there are two methods for managing jobs in a network device. One uses the job MIB (Management Information Base) protocol in which SNMP/MIB (Simple Network Management Protocol/MIB) control is used, and the other one uses the IPP (Internet Printing Protocol). These protocols enable display of a list of jobs in a network device, control of jobs (e.g., job suspension and job deletion), etc.

In addition, an event is used in order to monitor a change in the status of a job for printing. When the status of the job changes, this event is reported from the network device to a job management apparatus.

Regarding the case of reporting the end of a job in which printing is performed by a user, there is a method in which a job management apparatus displays a dialog box or the like by using a job-status-change event received from a network device.

There is also a method in which a job end is determined by performing polling to periodically acquire a list of jobs and a corresponding message is displayed for the user. However, in the above methods of the related art, on a network based on a WAN (wide area network) environment or in an environment in which a network traffic increases, a client application fails to detect a job-status-change event representing the end of a print job, so that the user is unable to accurately know the end of printing. Also, in an environment in which, even if a printer, which is an example of a peripheral apparatus, reports a job-status change on a timely basis, it is not ensured that the job-status change is reported to a client, a problem occurs in that the job status cannot be accurately found in real time.

In addition, since, in a high speed printer, a print job finishes in a short time, it is difficult for a client application to perform polling to monitor a job. Therefore, it is impossible to report a printing end to a user.

SUMMARY OF THE INVENTION

The present invention is directed to a job management method and a network device.

According to an aspect of the present invention, a method for managing a job sent from an information processing apparatus to a network device coupled thereto to process the job, includes the following steps: a managing step of managing job information representing status of the job processing by the network device which changes in a time series manner; a deleting step of deleting the job information after lapse of a predetermined time after completing the job processing by the network device; an acquiring step of acquiring the job information managed in the managing step; a recognizing step of recognizing whether or not the job information has already been deleted; and a job-completion recognizing step of recognizing that the job processing is completed responsive to at least one of recognizing in the recognizing step that the job information has already been deleted, and acquiring in the acquiring step the job information representing that the job processing is completed.

In another aspect, a method for managing, in an information processing apparatus, a job sent to a network device to be processed and then deleted after completion of the processing and lapse of a sustenance period, the method includes the following steps: a tracing step of tracing the job in the network device; and a polling step of polling for information regarding a status of the processing of the job by the network device. In yet another aspect, a program stored in memory and executable by an information processing apparatus to perform the just described method and system used in the above job management apparatus are provided. In addition, a program used therewith is provided.

In yet still another aspect, a network device operable to process a job from an information processing apparatus coupled thereto, includes: a first receiving unit configured to receive the job sent from the information processing apparatus; a processing unit configured to process the job; a deleting unit configured to delete the job after the processing unit completes processing the job and after a predetermined period; a maintaining unit maintaining job information; a second receiving unit configured to receive requests for job information from the information processing apparatus; and a reporting unit reporting the job information responsive to the second receiving unit receiving the requests for job information. Further features and advantages of the present invention will become apparent from the following description of the exemplary embodiments with reference to the attached drawings.

BRIEF DESCRIPTION OF THE DRAWINGS

The accompanying drawings, which are incorporated in and constitute a part of the specification, illustrate exemplary embodiments of the invention and, together with the description, serve to explain the principles of the invention.

DESCRIPTION OF THE EMBODIMENTS

Embodiments of the present invention will now be described in detail in accordance with the accompanying drawings.

Figure 1:
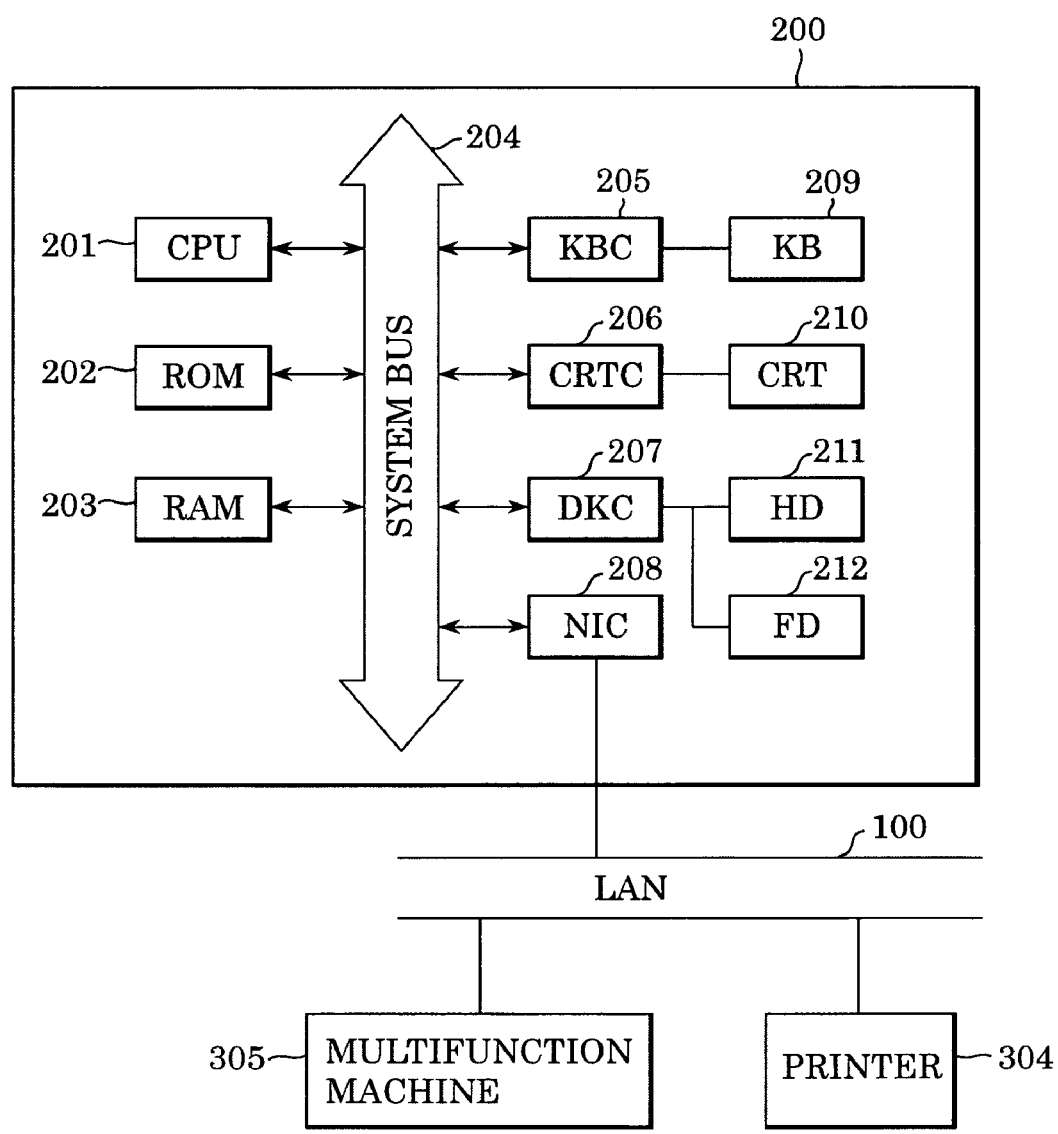
FIG. 1 is a block diagram showing an example of a job management system of the present invention.

FIG. 1 shows an example of a job management system of the present invention.

The job management system of the present invention is realized in the personal computer (PC) 200, serving as an information processing apparatus, shown in FIG. 1. A hard disk (HD) 211 stores programs constituting network job management software according to the present invention which is an operating subject in the following description. In the following descriptions, an executing subject is a central processing unit (CPU) 201 unless otherwise noted. In addition, a controlling subject on the software is the network job management software stored in the HD 211. In this embodiment, it is assumed that an operating system is, for example, Microsoft Windows 2000. However, the OS is not limited thereto.

Referring to FIG. 1, in the PC 200, a job management program is executed. The PC 200 includes the CPU 201 that executes the job management program, which is stored in the HD 211 or supplied from a disk controller (FD) 212. The PC 200 overall controls devices connected to a system bus 204.

A random access memory (RAM) 203 functions as a main memory or work area for the CPU 201. A keyboard controller (KBC) 205 controls instructive inputs from a keyboard (KB) 209 or a pointing device (not shown). A CRT controller (CRTC) 206 controls a display (CRT) 210 to display an image. A disk controller (DKC) 207 controls accessing of the hard disk 211 and the floppy disk 212, which stores a boot program, various applications, editing files, user files, the network management program, etc. A network interface card (NIC) 208 uses a local area network (LAN) 100 to bidirectionally transmit and receive data between an agent and a network device.

The network management program may be provided in a form stored in a floppy disk or CD-ROM. In this case, the program is read from a storage medium by the disk controller 212 or a CD-ROM drive (not shown), and is installed in the hard disk 211.

The job management program according to the present invention may be provided in a form stored in a storage medium such as a floppy disk or CD-ROM. In this case, the program is read from the storage medium by the disk controller 212 or the CD-ROM drive (not shown), and is installed in the hard disk 211. A multifunction machine 305 is an example of a peripheral apparatus including an image forming apparatus, and another peripheral apparatus is a printer 304. These peripheral apparatuses are connected to the PC 200, which is an example of a job managing apparatus, through the LAN 100, which is an example of a network.

Figure 2:
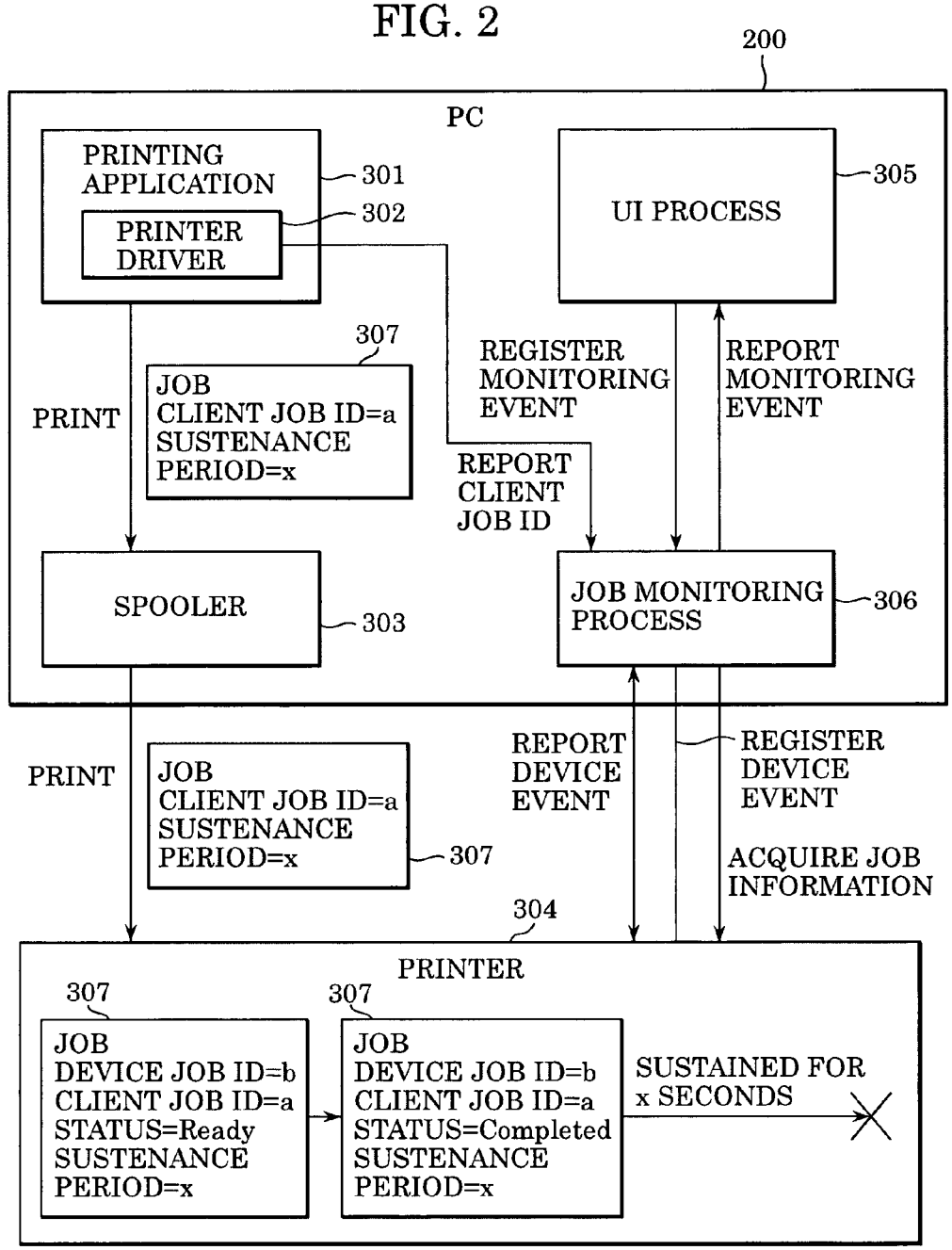
FIG. 2 is a block diagram showing an example of a job management system configuration including the PC and printer shown in FIG. 1.

FIG. 2 is a block diagram showing an example of a job management system configuration including the PC 200 and the printer 304 shown in FIG. 1. FIG. 2 shows the insides of the PC 200 and the printer 304. A printing application 301 uses a printer driver 302 to perform rasterization on a print job 307. At this time, the printer driver 302 adds a client job ID for identifying a client that issued the print job, and a sustenance period in which the print job is sustained after printing finishes. Although the printer driver 302 is used in this embodiment, it can be replaced by a facsimile driver. The print job 307 is transmitted to a spooler 303 in response to a GDI call. The spooler 303 transfers the print job 307 to the printer 304 by using, for example, the LPR protocol. As shown in FIG. 2, the printer 304 spools the print job 307. At this time, the printer 304 adds a device job ID to the print job 307 and changes the status of the print job 307 to a printing awaiting status (Ready). Subsequently, after printing is performed and a printed sheet is outputted, the status of the print job 307 is changed to a printing completion status (Completed). After that, the print job 307 is sustained in the printer 304 for the sustenance period, that is, x seconds in FIG. 2. Finally, the print job 307 is deleted in a memory of the printer 304. A UI (user interface) process 305 and a job monitoring process 306 are parts of the job management program. Both processes are stored in the hard disk 211 shown in FIG. 1 and are called and executed by the CPU 201. Also, the printing application 301 and the printer driver 302 are stored in the hard disk 211, and are executed by the CPU 201.

The UI process 305 registers a monitoring event in the job monitoring process 306 in order to monitor the print job 307. The job monitoring process 306 registers a device event in the printer 304 and starts to poll the printer 304 about job information. In order for the job information to be acquired by polling, job acquiring protocols (e.g., Job MIB using the SNMP protocol, IPP (Internet Printing Protocol), etc.,) are used. Polling for the job information is executed when a job start report is received from the printer driver 302. The job monitoring process 306 detects and recognizes a job status by acquiring a device event or status change information (which may be referred to as a "status change"), which is an example of job information of the print job 307 through a device event or polling for job information. The job monitoring process 306 reports the recognized job status to the UI process 305.

Figure 3:
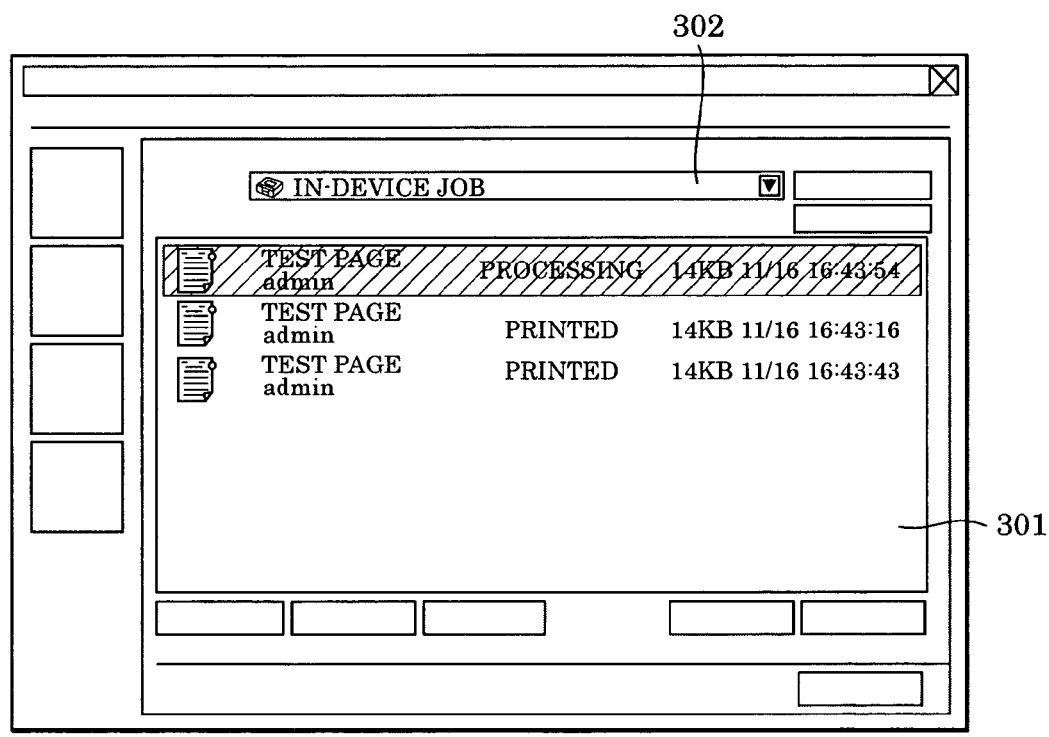
FIG. 3 is an illustration of an example of a screen displayed on the CRT shown in FIG. 1 by the UI process shown in FIG. 2.

FIG. 3 shows an example of a screen displayed on the CRT 210 shown in FIG. 1 by the UI process 305 shown in FIG. 2. Detailed operations of the UI process 305, the printer driver 302, the printer 304, and the job monitoring process 306 are described below by using flowcharts.

The document name shown in FIG. 3 is "TEST PAGE" and its owner is "admin." The CRT 210 displays the statuses of jobs that process documents. The statuses of the three jobs shown in FIG. 3 are displayed as "PROCESSING", "PRINTED", and "PRINTED" in the order from the top. These displayed items are each switched from "PROCESSING" to "PRINTED" in such a manner that the UI process 305 and the job monitoring process 306 cooperatively operate (described in detail later).

Figure 4:
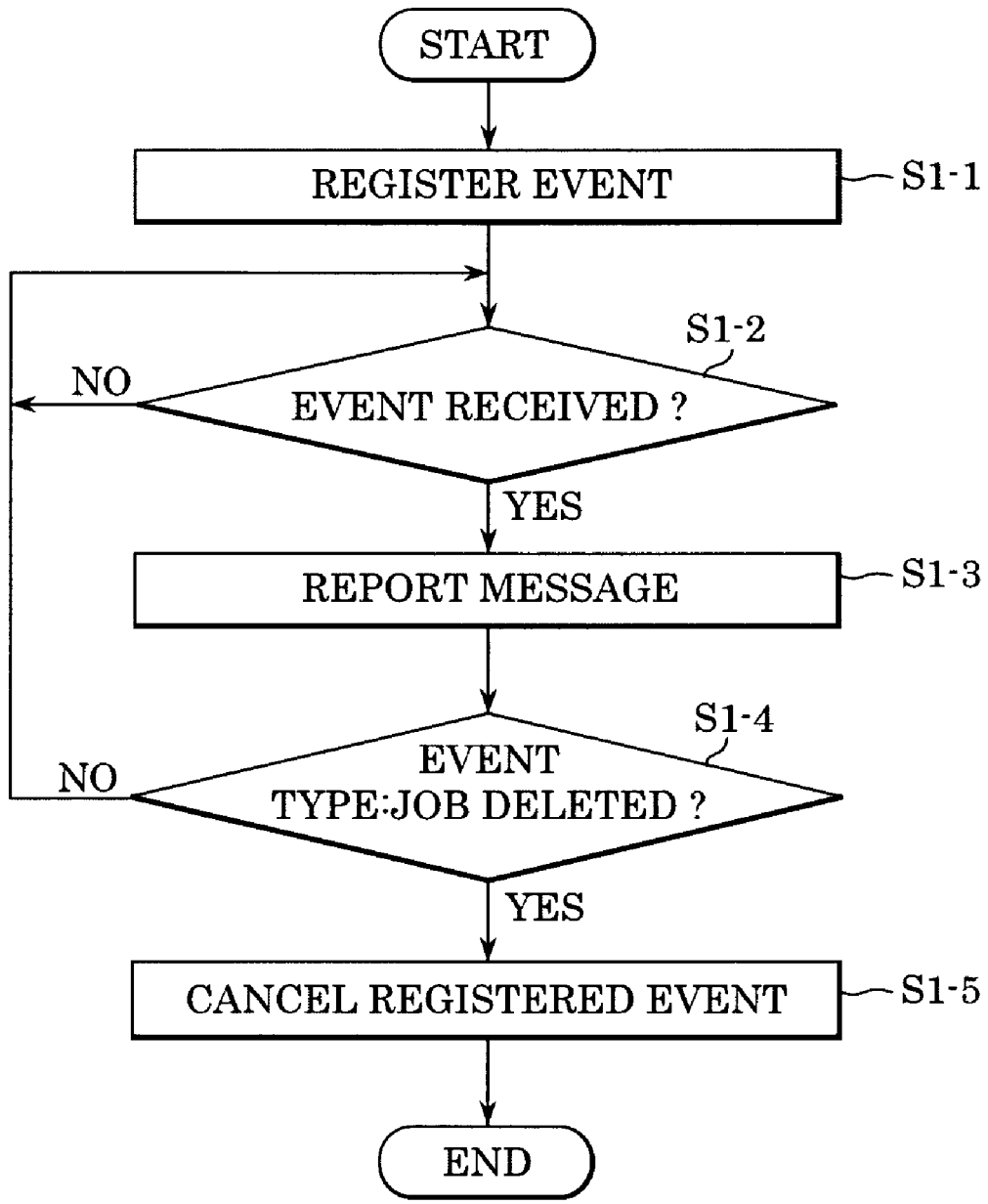
FIG. 4 is a flowchart showing an example of an event registration process of the UI process shown in FIG. 2.

FIG. 4 shows an example of an event process of the UI process 305. In step S1-1, the UI process 305 registers an event in the job monitoring process 306. In step S1-2, it is determined whether or not the event has been received. If the event has not been received yet, the process returns to step S1-2, and the UI process 305 enters an event-reception awaiting status. If the event has been received, the process proceeds to step S1-3. In step S1-3, the UI process 305 displays a message box, changes a job status, including a printed status while the list of jobs shown in FIG. 3 are being processed, and reports the job status change to a user. In step S1-4, it is determined whether the type of the reported event is a job deletion report. If the type of the reported event is not the job deletion report, the process returns to step S1-2 and the UI process 305 enters an event-reception awaiting status. If the type of the reported event is the job deletion report, the registered event is cancelled and job tracing is finished.

Figure 5:
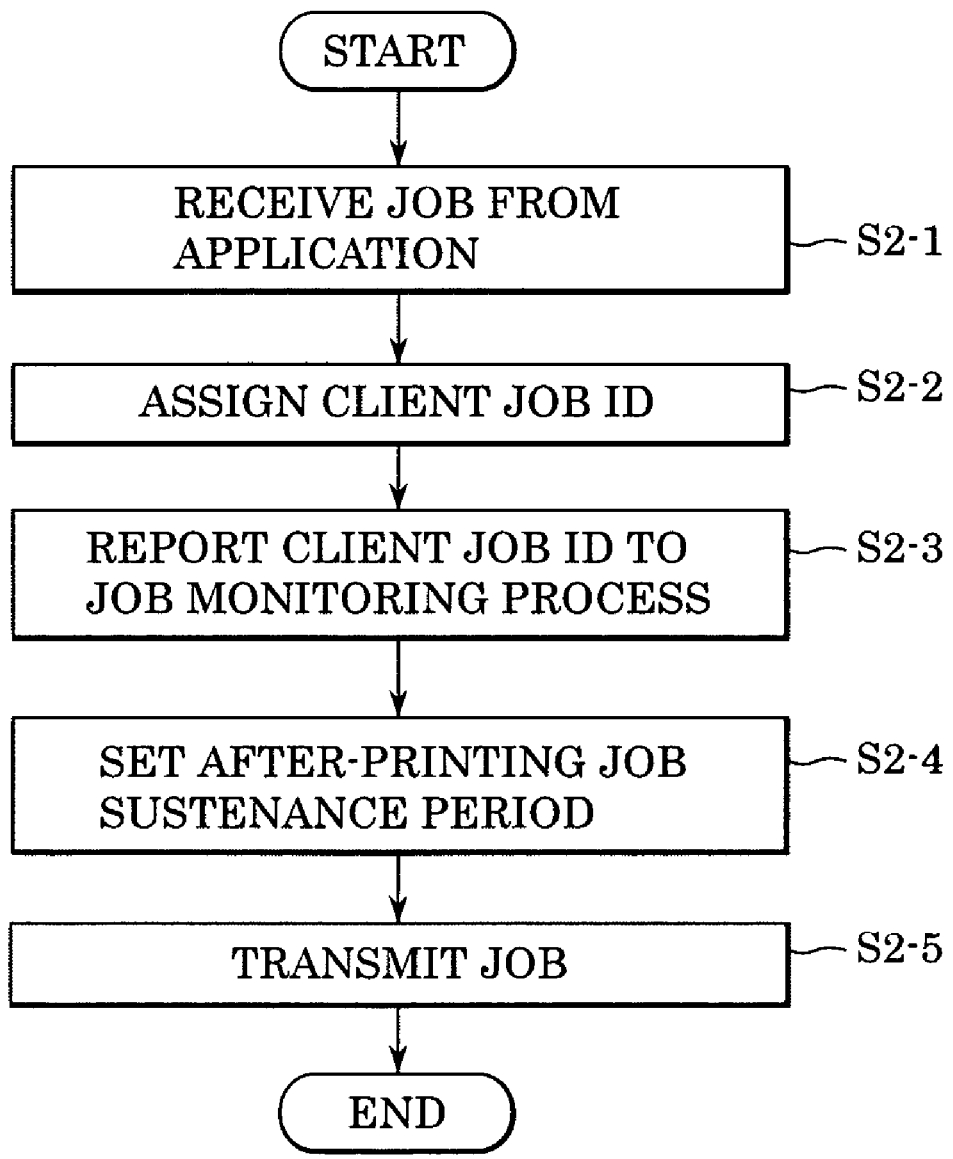
FIG. 5 is a flowchart showing an example of a job transmitting process of the printer driver shown in FIG. 2.

FIG. 5 shows an example of a job transmitting process of the printer driver 302 shown in FIG. 2. In step S2-1, a print job is received from the printing application 301. In step S2-2, a client job ID, which can be identified for each client, is assigned to the print job. The client job ID is an ID by which a job generated in a distributed client PC can be uniquely identified. For example, UUID is used. In step S2-3, the client job ID is reported to the job monitoring process 306. In step S2-4, an after-printing job-sustenance period set in the printer driver 302 beforehand is set in the print job 307. In step S2-5, by performing GDI writing, the print job 307 is transmitted to the spooler 303.

Figure 6:
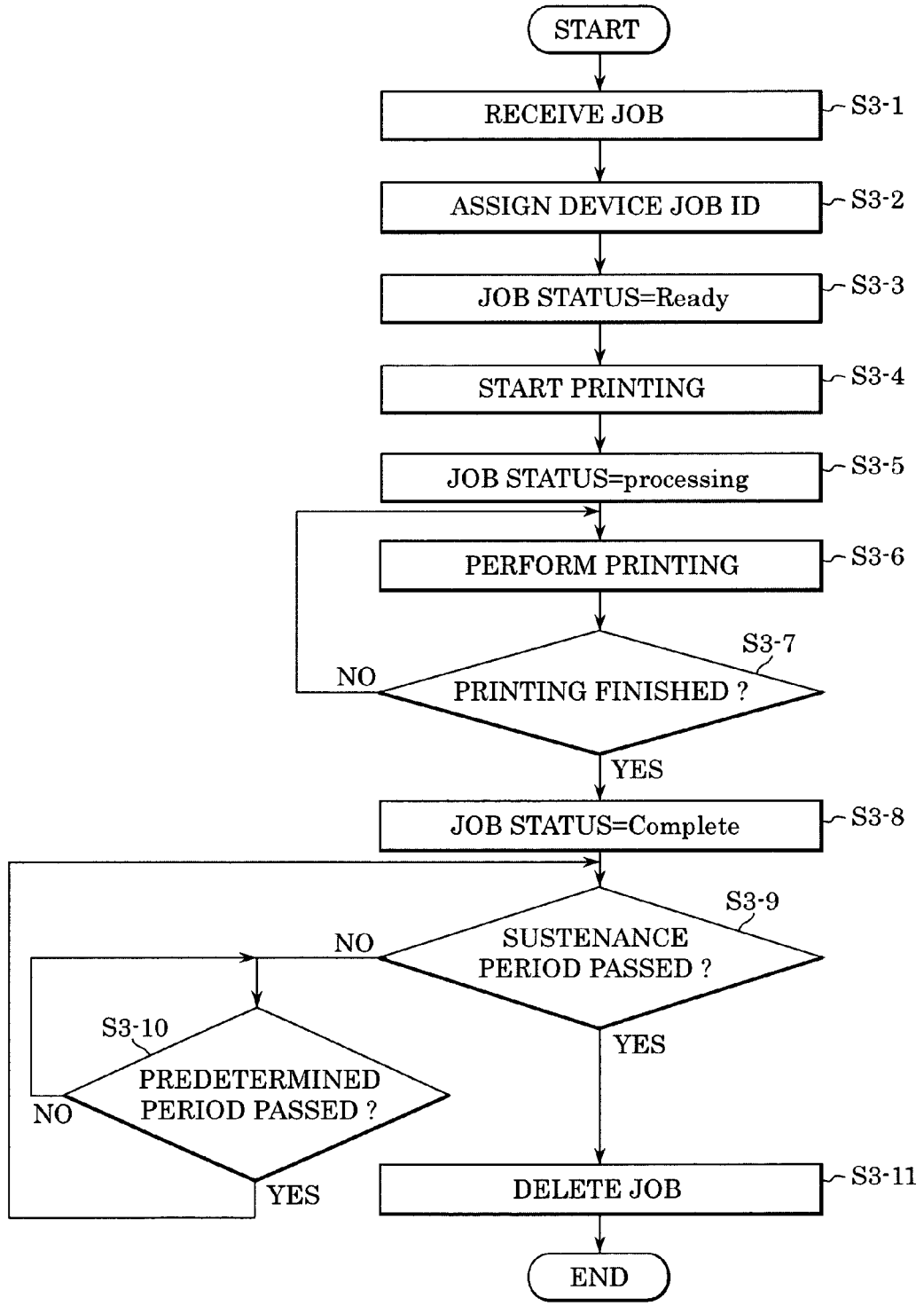
FIG. 6 is a flowchart showing an example of a job change in the printer.
Figure 9:
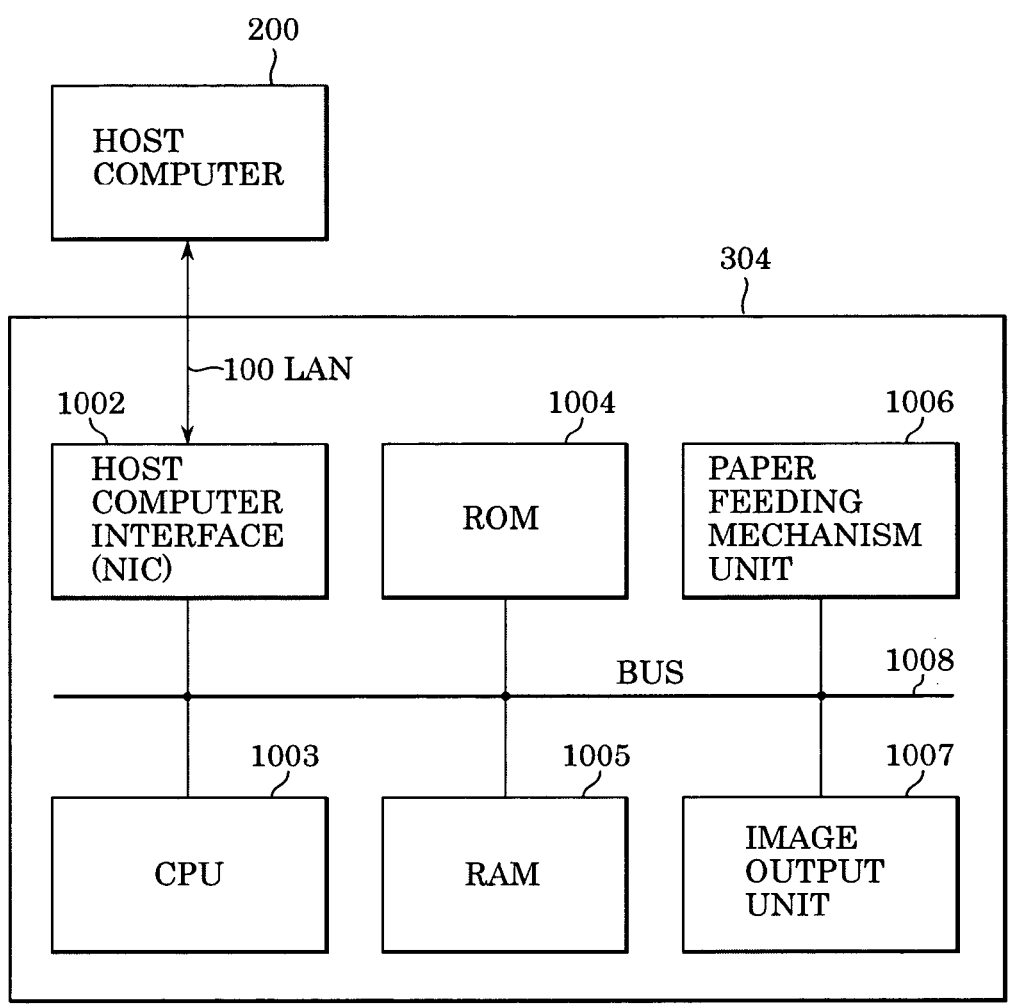
FIG. 9 is a block diagram showing the hardware configuration of the printer shown in FIG. 1.

FIG. 6 shows an example of a job change in the printer 304. FIG. 9 is a block diagram showing the hardware configuration of the printer 304.

The hardware configuration shown in FIG. 9 is a printer control system. The printer 304 includes a host computer interface unit 1002, a CPU 1003, a ROM 1004, a RAM 1005, a paper feeding mechanism unit 1006, an image output unit 1007, and a bus 1008. The host computer 200 shown in FIG. 9 is the PC 200 that is an example of the job management apparatus connected to the printer 304 in a form capable of data communication. Obviously, the host computer 200 may be directly connected or built into an MFP (multifunction peripheral) or the like (not shown).

Specifically, the PC 200 creates a document and transmits a document printing request to the printer 304. In the printer 304, the host computer interface unit 1002 is formed as a serial interface circuit, a parallel interface circuit, or a LAN interface circuit. The host computer 200 transmits the document printing request to the CPU 1003. The host computer interface unit 1002 conversely transmits information of the printer 304 to the host computer 200. The ROM 1004 stores a control program for controlling the operation of each unit. The RAM 1005 stores a control program, and, in addition, a print image transmitted from the host computer to the printer 304.

The image output unit 1007 uses laser beam scanning to form the print image stored in the RAM 1005 onto a photosensitive drum. The paper feeding mechanism unit 1006 performs paper feeding by controlling paper feeding rollers disposed in portions of a paper carrying system in response to the formation of the print image on the photosensitive drum. A sheet of paper is carried to a transfer position of the photosensitive drum, on which the print image is formed, and the formed image is transferred to the sheet, and printing is completed. The CPU 1003 controls each of the above components based on the control program stored in the ROM 1004. Based on the control program, the CPU 1003 also executes the processes indicated by flowcharts described later. The bus 1008 connects component units of the printer 304 and is used as a communication path.

Referring back to FIG. 6, the multifunction machine 220 is similar in configuration to the printer 304 shown in FIG. 9 except for a facsimile function. The control program stored in the ROM 1004 in FIG. 9 in the printer 304 in FIG. 2 is executed by the CPU 1003 in the printer 304 shown in FIG. 4 (corresponding to the printer 304 shown in FIG. 2). This executes the following processing. In step S3-1, the printer 304 receives the print job 307 from the spooler 303. In step S3-2, a device job ID, which is unique in the printer 304 as a device, is assigned. In step S3-3, the status of the print job is changed to a printing awaiting status (Ready). In step S3-4, printing is started. After the printing is started, in step S3-5, the status of the print job is changed to a printing status (Processing). In step S3-6, printing is performed. In step S3-7, it is determined whether the printing has finished.

When the printing has finished, the process proceeds to step S3-8, and the status of the print job is changed to a printing completion status (Complete). After the printing is completed, it is determined whether an after-printing job-sustenance period has elapsed in step S3-9. If the after-printing job-sustenance period has not elapsed, the process proceeds to step S3-10 and waits for a predetermined period to elapse. After that, the process returns to step S3-9 again. If the after-printing job-sustenance period has elapsed, in step S3-11, the print job is deleted. The process is completed in this step S3-11. The print job stored in the RAM 1005 shown in FIG. 9, which includes document data, print data, and job information, is deleted.

Figure 7:
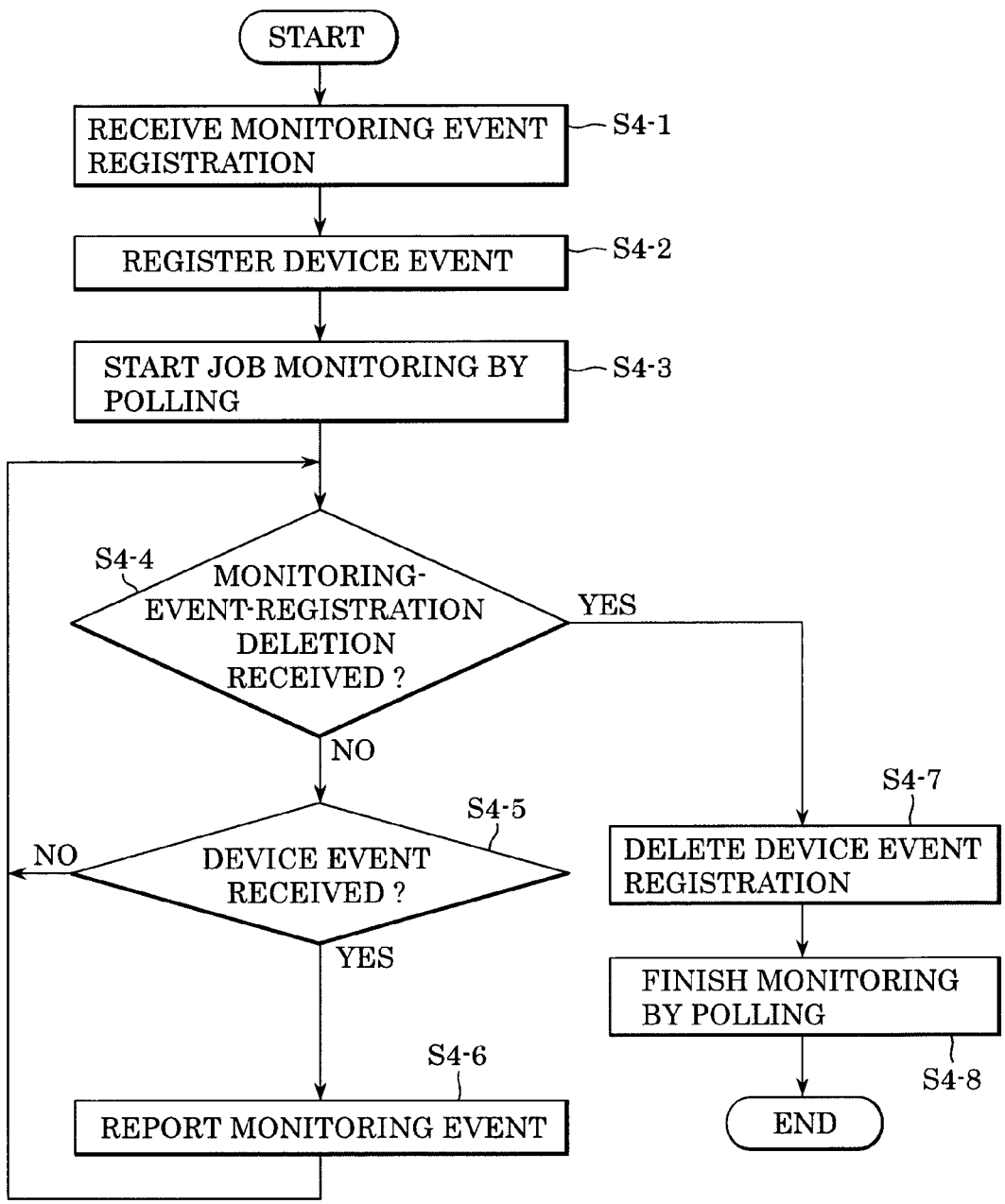
FIG. 7 is a flowchart showing an example of a job monitoring process.

FIG. 7 shows an example of the job monitoring process 306 shown in FIG. 2. In step S4-1, a monitoring event to be registered is received from the UI process 305. In step S4-2, a device event is registered in the printer 304. In step S4-3, job monitoring is performed by performing polling. Details of the job monitoring by performing polling are described with reference to the flowchart shown in FIG. 8. By using, in combination, the device event and the job monitoring by polling, even if the device event is not detected, the job status can be reported. In step S4-4, it is determined whether an instruction of a monitoring-event-registration deletion has been received. If the instruction of the monitoring-event-registration deletion has not been received, the process proceeds to step S4-5 and it is determined whether a device event has been received. If the device event has not been received, the process returns to step S4-4, and the job monitoring process 306 enters a device event awaiting status. If the device event has been received, the process proceeds to step S4-6, the received event is converted to a monitoring event and the monitoring event is reported to the UI process 305. After that, the process returns to step S4-4, and the job monitoring process 306 enters an event awaiting status. If the instruction of the monitoring-event-registration deletion has been received, in step S4-7, the registered device event is deleted in the printer 304, and, in step S4-8, the job monitoring by polling finishes.

Figure 8:
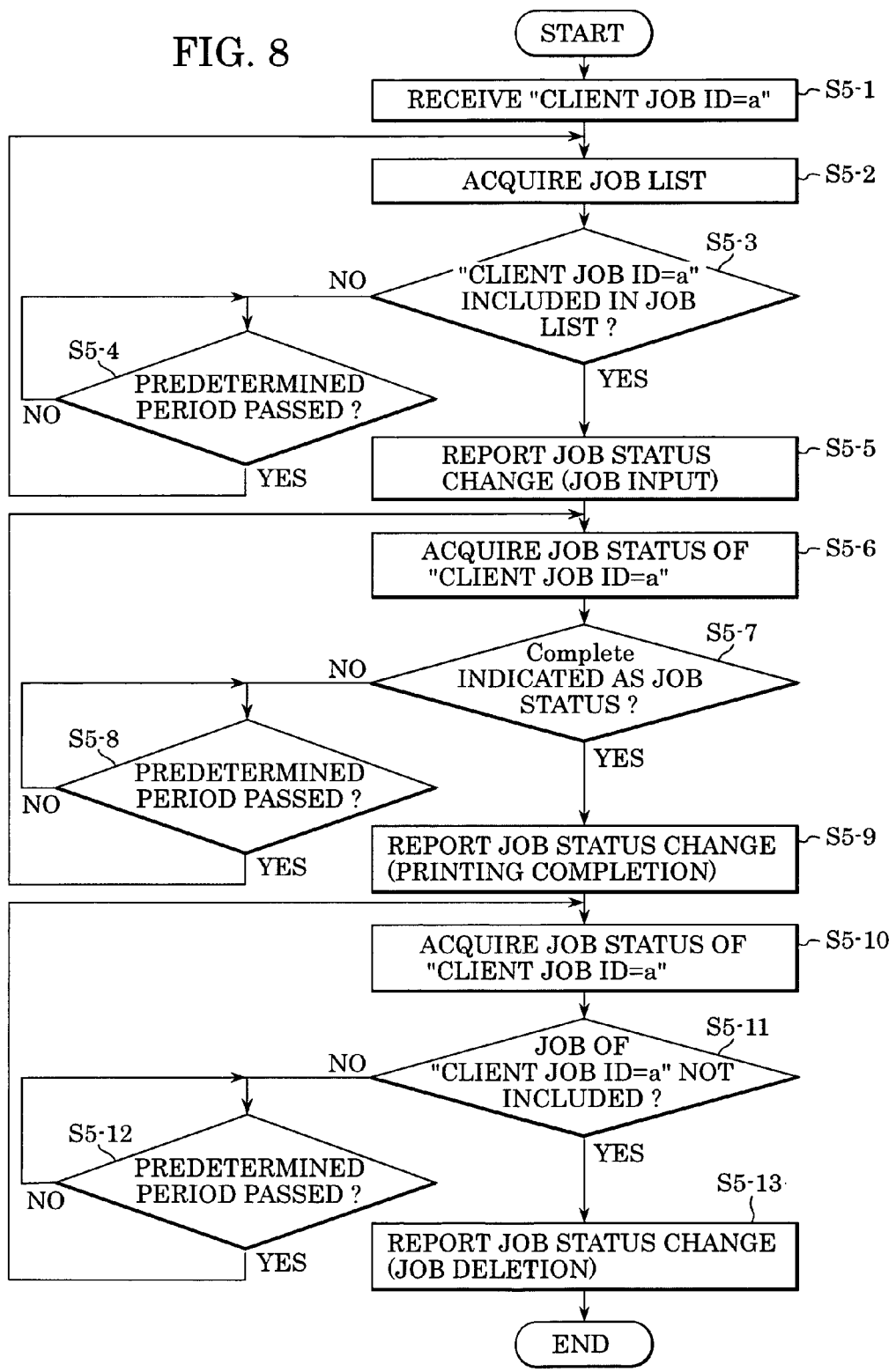
FIG. 8 is a flowchart showing another example of the job monitoring process.

FIG. 8 shows an example of the job monitoring process 306 shown in FIG. 2. In other words, FIG. 8 is a flowchart showing job monitoring by polling which is performed by the job monitoring process 306. Prior to the job monitoring by polling, it is assumed that the monitoring event has been registered by the UI process 305. In step S5-1, the client job ID is received from the printer driver 302. Since the client job ID of the print job 307, which is to be monitored, is reported, in step S5-2, a list of jobs is acquired from the printer 304 and polling is started. In step S5-3, it is determined whether the acquired list of jobs includes the client job ID of the print job 307, which is to be monitored. If the client job ID of the print job 307 is not included, in step S5-4, the process waits for a predetermined period to elapse, and returns to step S5-2 again. If the client job ID of the print job 307 is included, the process proceeds to step S5-5, and a job status change indicating that a job has been input is reported to the UI process 305. Since it is recognized that the print job 307 is stored in the printer 304, only the print job 307 is monitored by using the device ID after step S5-5. In step S5-6, the status of the print job 307 is acquired, and polling is started for a job status included in the print job 307. In step S5-7, it is determined whether the job status of the print job 307, which is an example of job information, represents completion (indicated by "Complete" in FIG. 8) of printing. If the job status does not represent completion of printing, the process proceeds to step S5-8, and waits for a predetermined period to elapse. After that, the process returns to step S5-6 again. At this time, the UI process 305 displays, on the CRT 210, "PROCESSING" that represents printing or image forming processing as shown in FIG. 3. If the job status represents completion of printing, the process proceeds to step S5-9, and reports a job status change to the UI process 305. At this time, the UI process 305 switches the displayed item on the CRT 210 from "PROCESSING" to "PRINTED" as shown in FIG. 3.

As described above, the PC 200, which is an example of a job management apparatus communicating with the printer 304, which is an example of a network device capable of processing a job subject to image processing and printing, has been described. The job monitoring process 306 has been described in which the PC 200 executes the job management program to manage job information including the status of a job which changes in a time series manner, and after processing on the job is completed and a predetermined time, that is, the time designated by the sustenance period, subsequently elapses, the job information is deleted. The job monitoring process 306 acquires job information to be managed by itself. Based on whether the job information can be acquired, the UI process 305 recognizes whether the job information (or the job itself), which includes a job status, has already been deleted. When the job monitoring process 306 recognizes that the job information has already been deleted, or it is recognized that job information representing completion of processing the job is acquired, completion of the job processing is recognized.

In response to a request of the PC 200 for job information from the network device, the printer 304 may transmit the job information and the transmitted job information may be acquired by the job monitoring process 306. In the case of detecting an event in which the network device transmits job information without receiving a request from the job management apparatus, the job monitoring process 306 may acquire the job information. When failing to acquire job information, the job monitoring process 306 recognizes that the job has already been deleted and further recognizes that the job processing is completed. The job processing may be printing or facsimile processing. The job may be a print job or a facsimile job. The job monitoring process 306 periodically acquires job information. By transmitting a command, the job monitoring process 306 may set the printer 304 so that, after completion of printing, in a period longer than each of intervals at the job information is acquired, the job can be stored without being deleted.

The job monitoring process 306 may set the printer 304 so that, also after completion of the job, the job information can be acquired by the printer 304 in a period shorter than a time up to deletion of the job. The UI process 305 is used to control display of a job status on the CRT 210 based on the result of recognition of job completion by the job monitoring process 306.

The print job 307 is stored in the printer 304 in an after-printing sustenance period even after printing. In step S5-10, the job status of the print job 307 is acquired. In step S5-11, it is determined whether the print job 307 is or is not included. If the job is included, the process proceeds to step S5-12 and waits for a predetermined period to elapse. After that, the process returns to step S5-10. If the job is not included, the after-printing job-sustenance period elapses and it is recognized that the job has been deleted in the printer 304. Thus, in step S5-13, a job status change is reported to the UI process 305. At this time, the UI process 305 controls the CRT 210 to display "PRINTED", which represents a printing-completion status, as shown in FIG. 3.

Accordingly, job monitoring by polling makes it possible to confirm completion of printing based on the print job 307 within the after-printing sustenance period. This ensures that a printing end can be reported to the user. When a facsimile driver is used instead of the printer driver 302, facsimile-transmitting-job monitoring by polling makes it possible to confirm completion of facsimile transmission based on a facsimile transmitting job within a job sustenance period after facsimile transmission. This ensures that the end of facsimile transmission can be reported to the user.

Other Embodiments

The processes (in the above embodiment) shown in FIGS. 2, 4, 5, 6, 7, and 8 are executed by apparatuses such as the PC 200, the printer 304, and the multifunction machine 220 in accordance with externally installed programs. In this case, the present invention is applicable to even a case in which groups of pieces of information including programs are supplied to the PC 200 from a storage medium such as CD-ROM, a flash memory, or a floppy disk, or from an external storage medium through a network.

Obviously, the present invention is also achieved such that a storage medium (or a recording medium) containing the program code of software for implementing the functions in the above embodiments is provided to a system or apparatus or is downloaded from an external server (not shown), and a computer (or a CPU/MPU) in the system or apparatus reads and executes the program code stored in the storage medium.

In this case, the program code read from the storage medium, itself, implements the functions in the above embodiments. Accordingly, the storage medium storing the program code is included in the present invention. Storage media for providing the program code include, for example, a floppy disk, a hard disk, an optical disk, a magneto-optical disk, DVD, CD-ROM, a magnetic tap, a nonvolatile memory card, ROM, and EEPROM.

Obviously, the present invention includes not only a case in which the computer executes the read program code, whereby the functions in the above embodiments are implemented, but also a case in which, based on instructions of the program code, an OS active in the computer performs all or part of actual processing and the processing implements the functions in the above embodiments. The present invention also includes a case in which, after program code read from a storage medium is written in a memory in an add-in card inserted into a computer or an add-in unit connected to the computer, based on instructions of the program code, a CPU or the like provided in the add-in card or unit performs all or part of actual processing and the processing implements the functions in the above embodiments.

While the present invention has been described with reference to what are presently considered to be the exemplary embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

This application claims priority from Japanese Patent Application No. 2004-015830 filed Jan. 23, 2004, which is hereby incorporated by reference herein.

What is claimed is:
1. A method for managing a job sent from an information processing apparatus to a network device coupled thereto via a network to process the job, comprising the following steps:
a managing step of managing job information representing status of the job processing by the network device which changes in a time series manner;
a deleting step of deleting the job information after lapse of a predetermined time after completing the job processing by the network device;

an acquiring step of acquiring the job information managed in the managing step via the network;

a recognizing step of recognizing whether or not the job information has already been deleted in a case where the job information cannot be acquired via the network within the predetermined time;

a job-completion recognizing step of recognizing that the job processing is completed responsive to at least one of recognizing in the recognizing step that the job information has already been deleted, and acquiring in the acquiring step the job information representing that the job processing is completed; and a displaying step of displaying a job completion when the job processing is recognized as being completed in the job-completion recognizing step.

2. The method according to claim 1, further comprising:

a requesting step of requesting the job information from the network device;

a transmitting step of transmitting from the network device the job information requested in the requesting step; and the acquiring step acquiring the job information transmitted in the transmitting step.

3. The method according to claim 1, further comprising a detecting step of detecting an event from the network device without receiving any requests from the information processing apparatus, and responsive thereto, acquiring the job information in the acquiring step.

4. The method according to claim 1, wherein:

the job processing is one of printing and facsimile processing;

the job is one of a printing job and a facsimile job;

the acquiring step includes acquiring the job information periodically; and in a period longer than each of intervals at which the job information is acquired in the acquiring step, the managing step includes storing the job without being deleted after completing the job processing.

5. The method according to claim 1, wherein after the job processing is completed, the acquiring step includes acquiring the job information to be transmitted to the network device at intervals each shorter than a time required to delete the job.

6. The method according to claim 1, further comprising a displaying step of displaying the status of the job on a display unit based on the recognition of the recognizing step.

7. A computer-readable medium having stored thereon a computer program comprising program code having computer-executable instructions for causing a computer to execute the method according to claim 1.

* * * * *